United States Patent [19]

Kitano et al.

[11] Patent Number: 4,774,020
[45] Date of Patent: Sep. 27, 1988

[54] PYRIMIDINYLDIOXANE DERIVATIVES

[75] Inventors: Kisei Kitano; Tetsuya Ogawa, both of Yokohamashi; Naoyuki Yoshida, Kamakurashi, all of Japan

[73] Assignee: Chisso Corporation, Tokyo, Japan

[21] Appl. No.: 877,527

[22] Filed: Jun. 23, 1986

[30] Foreign Application Priority Data

Jul. 4, 1985 [JP] Japan .................. 60-147057

[51] Int. Cl.$^4$ .................. G02F 1/13; C09K 19/34; C07D 239/02
[52] U.S. Cl. .................. 252/299.61; 252/299.5; 350/350 R; 350/350 S; 544/315; 544/318; 544/335; 544/242; 549/370
[58] Field of Search .................. 350/350 R, 350 S; 252/299.61, 299.5; 544/318, 315, 335, 242; 549/370

[56] References Cited

U.S. PATENT DOCUMENTS

| | | | |
|---|---|---|---|
| 4,322,354 | 3/1982 | Sorkin .................. | 252/299.61 |
| 4,325,830 | 4/1982 | Sethofer .................. | 252/299.61 |
| 4,344,856 | 8/1982 | Demus et al. .................. | 252/299.61 |
| 4,348,324 | 9/1982 | Demus et al. .................. | 252/299.61 |
| 4,389,329 | 6/1983 | Boller et al. .................. | 252/299.61 |
| 4,450,094 | 5/1984 | Sato et al. .................. | 252/299.61 |
| 4,462,923 | 7/1984 | Boller et al. .................. | 252/299.61 |
| 4,486,332 | 12/1984 | Demus et al. .................. | 252/299.61 |
| 4,537,698 | 8/1985 | Sucrow et al. .................. | 252/299.61 |
| 4,564,694 | 1/1986 | Hirai et al. .................. | 252/299.61 |
| 4,565,425 | 1/1986 | Petrzilka et al. .................. | 252/299.61 |
| 4,597,892 | 7/1986 | Zaschke et al. .................. | 252/299.61 |
| 4,609,485 | 9/1986 | Kitano et al. .................. | 252/299.61 |
| 4,621,901 | 11/1986 | Petrzilka et al. .................. | 252/299.61 |
| 4,676,604 | 6/1987 | Petrzilka .................. | 252/299.61 |
| 4,704,227 | 11/1987 | Krause et al. .................. | 252/299.61 |
| 4,713,197 | 12/1987 | Eidenschink et al. .................. | 252/299.61 |

FOREIGN PATENT DOCUMENTS

| | | | |
|---|---|---|---|
| 56501 | 7/1982 | European Pat. Off. .................. | 252/299.61 |
| 84194 | 7/1983 | European Pat. Off. .................. | 252/299.61 |
| 87679 | 9/1983 | European Pat. Off. .................. | 252/299.61 |
| 149238 | 7/1985 | European Pat. Off. .................. | 252/299.61 |
| 3315295 | 10/1984 | Fed. Rep. of Germany .................. | 252/299.61 |
| 3322982 | 1/1985 | Fed. Rep. of Germany .................. | 252/299.61 |
| 3335244 | 4/1985 | Fed. Rep. of Germany .................. | 252/299.61 |
| 3405914 | 8/1985 | Fed. Rep. of Germany .................. | 252/299.61 |
| 3404116 | 8/1985 | Fed. Rep. of Germany .................. | 252/299.61 |
| 3411571 | 10/1985 | Fed. Rep. of Germany .................. | 252/299.61 |
| 3437935 | 4/1986 | Fed. Rep. of Germany .................. | 252/299.61 |
| 56-164179 | 12/1981 | Japan .................. | 252/299.61 |
| 57-16879 | 1/1982 | Japan .................. | 252/299.61 |
| 57-64689 | 4/1982 | Japan .................. | 252/299.61 |
| 59-98065 | 6/1984 | Japan .................. | 252/299.61 |
| 86/0067 | 1/1986 | PCT Int'l Appl. .................. | 252/299.61 |
| 2092169 | 8/1982 | United Kingdom .................. | 252/299.61 |

Primary Examiner—Teddy S. Gron
Attorney, Agent, or Firm—Wenderoth, Lind & Ponack

[57] ABSTRACT

A novel compound which is able to improve various characteristics of display element by using it as a component for liquid crystal compositions, and a liquid crystal composition containing the same are provided, which compound is a 2-pyrimidinyl-1, 3-dioxane compound expressed by the formula

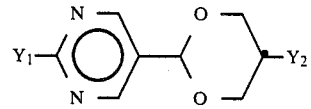

wherein $Y_1$ represents —R,

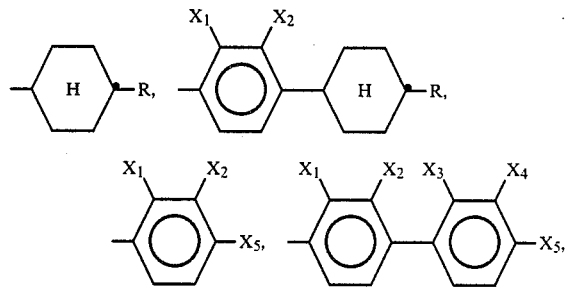

$SCH_3$ or —CN; $Y_2$, —R,

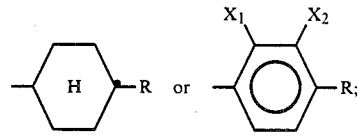

R, an alkyl group of 1–12 C and one or two $CH_2$ groups therein can be replaced by oxygen atom; $X_1$, $X_2$, $X_3$ and $X_4$ each independently are choiced from H, F, Cl, Br or —CN; and $X_5$, F, Cl, Br, —CN or an alkyl group of 1–12 C and one or two $CH_2$ groups therein can be replaced by oxygen atom.

4 Claims, No Drawings

PYRIMIDINYLDIOXANE DERIVATIVES

BACKGROUND OF THE INVENTION

1. Field of the Invention

This invention relates to a novel liquid crystal compound and a liquid crystal composition containing the same.

2. Description of the Prior Art

Liquid crystal substances and their compositions have been used in various display devices by utilizing the dielectric anisotropy (abbreviated to $\Delta\epsilon$) and the optical anisotropy (abbreviated to $\Delta n$) of the substances and the compositions, and their display modes are classified into TN type (twisted nematic type), DS type (dynamic scattering type), guest-host type, DAP type, etc. As liquid crystal materials used for these, there is no single compound which can endure various practical uses in the aspect of various characteristics of the display element, i.e., mesomorphic range, driving voltage, response properties, etc.; hence at present, several kinds of liquid crystal compounds or mixtures thereof with non-liquid crystal compounds have been practically used.

In general, a liquid crystal material having an optional $\Delta\epsilon$ value can be obtained by adequately blending those having different $\Delta\epsilon$ values. In order to obtain a liquid crystal composition having a large $\Delta\epsilon$ value, it is necessary to use components having $\Delta\epsilon$ values as large as possible, and in this case, those having a good compatibility with other components and making the viscosity of the resulting composition lower are preferred, and the liquid crystal materials are required to be stable to moisture, light, heat, air, etc. At present, however, there is no single compound which satisfies all of such conditions, but several kinds of liquid crystal compounds or blends thereof with compounds similar to liquid crystal compounds have been practically used. Further, particularly recently, liquid crystal display elements which operate within a broad temperature range of low temperatures to high temperatures have come to be required.

SUMMARY OF THE INVENTION

The object of the invention is to provide a compound which is able to improve various characteristics of display elements by using the compound as a component for liquid crystal compositions, and a liquid crystal composition containing the compound.

The present invention resides in:

a 2-pyrimidinyl-1,3-dioxane compound expressed by the formula

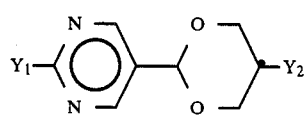

wherein $Y_1$ represents $-R$,

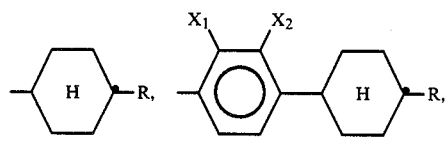

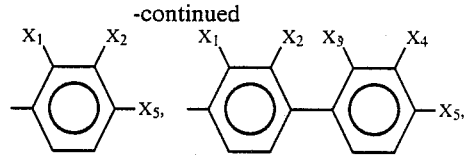

$-SCH_3$ or cyano group; $Y_2$ represents $-R$,

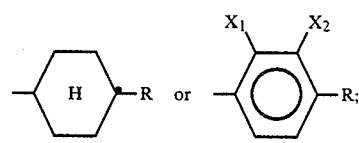

R represents an alkyl group of 1 to 12 carbon atoms and one or two $CH_2$ groups therein can be replaced by oxygen atom; $X_1$, $X_2$, $X_3$ and $X_4$ each independently are choiced from hydrogen, fluorine, chlorine, bromine or cyano group; and $X_5$ represents fluorine, chlorine, bromine, cyano group or an alkyl group of 1 to 12 carbon atoms and one or two $CH_2$ groups therein can be replaced by oxygen atom, and a liquid crystal composition containing the above 1,3-dioxane compound.

DETAILED DESCRIPTION OF PREFERRED EMBODIMENTS

The compound of the present invention may be prepared according to the following reaction equations:

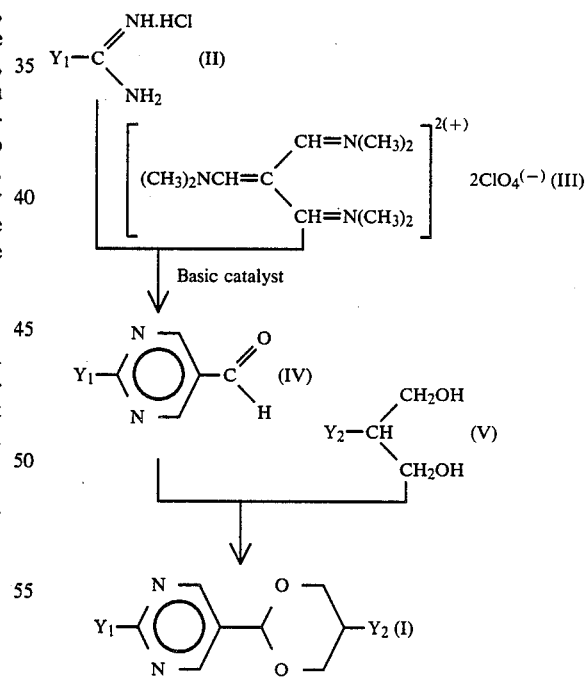

Namely, an amidine hydrochloride derivative (II) and {2-[(dimethylamino)methylene]propanediylidene} bis[dimethylammonium perchlorate] (III) are subjected to condensation-cyclization reaction in the presence of a suitable catalyst such as a metal alcoholate, NaOH, 1,8-diazabicyclo(5.4.0)-7-undecene, etc. to obtain a 2-substituted-5-formylpyrimidine (IV).

Next, this 2-substituted-5-formylpyrimidine (IV) is reacted with a 2-substituted-1,3-propanediol (V) in the presence of a catalyst in an inert organic solvent at a reflux temperature under the atmospheric pressure. As the organic solvent, benzene, toluene, chloroform, carbon tetrachloride, methylene chloride, etc. are suitable. As the catalyst, Lewis acids such as aluminum chloride, tin tetrachloride, titanium, tetrachloride, etc., and hydroacids such as sulfuric acid, phosphoric acid, toluenesulfonic acid, etc. are usable. This reaction product is a mixture of cis-form and trans-form compounds, and since the cis-form compound is lower in melting point and greater in solubility than those of the trans form compound, it is possible to obtain the trans form compound (I) separated from the cis form compound, by carrying out recrystallization.

Further, compounds of the formula (I) of the present invention wherein $Y_1$ represents cyano group or an alkoxy group of 1 to 12 carbon atoms are obtained from a compound (Ia) prepared according to the above process as follows:

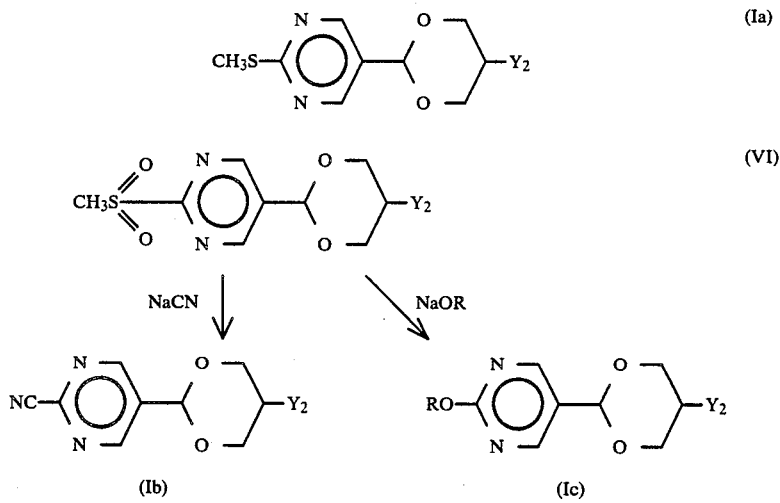

Namely, 2-(2-methylthio-5-pyrimidinyl)-5-substituted-1,3-dioxane (Ia) as a compound of the present invention is treated with aqueous hydrogen peroxide to convert the methylthio group into methylsulfonyl group, followed by reacting the resulting 2-(2-methylsulfonyl-5-pyrimidinyl)-5-substituted-1,3-dioxane (VI) with NaCN to obtain a 2-(2-cyano-5-pyrimidinyl)-5-substituted-1,3-dioxane (Ib) as an objective compound, or by reacting the compound (VI) with a sodium alkoxide to obtain a 2-(2-alkoxy-5-pyrimidinyl)-5-substituted-1,3-dioxane (Ic) as an objective compound.

The compounds of the present invention have a large dielectric anisotropy value in liquid crystal phases, a low viscosity and a superior stability to heat, light, electricity, air, moisture, etc. required for liquid crystal display materials. Further, the compounds of the present invention have a good compatibility with other liquid crystal compounds such as those of esters, Schiff's bases, azoxy compounds, biphenyls, cyclohexanes, pyrimidines, etc.; hence by blending them with these compounds or mixtures thereof, it is possible to constitute liquid crystal compositions suitable for various liquid crystal display elements. For example, when the compounds of the present invention are added as a component of liquid crystal compositions for TN display elements, it is possible to increase the dielectric anisotropy value of the liquid crystal compositions and also reduce the driving voltage of the TN display elements.

The present invention will be described in more detail by way of Examples, but it should not be construed to be limited thereto.

EXAMPLE 1

(Preparation of 2-{2'-(4"-fluorophenyl)pyrimidinyl-5'}-5-n-propyl-1,3-dioxane)

[2-{(Dimethylamino)methylene}propanediylidene]-bis(dimethylammonium perchlorate) (68 g, 0.18 mol) and 4-fluorobenzamidine hydrochloride (37 g, 0.21 mol) were added to a solution of sodium methylate (11.5 g, 0.21 mol) dissolved in anhydrous methanol (200 ml), followed by heating the reaction mixture with stirring at 40° C. for 8 hours, adding glacial acetic acid (15 ml) to the reaction liquid, agitating the mixture at 20° C. for 30 minutes, concentrating the reaction mixture under reduced pressure by means of an evaporator, adding toluene (1 l) to the concentrated residue to extract the product, washing the extract solution with water, drying the toluene layer with anhydrous magnesium sulfate, distilling off toluene, and purifying by recrystallizing the residue from toluene to obtain 2-(4'-fluorophenyl)-5-formylpyrimidine (25 g, 0.12 mol) having a m.p. of 168° C.

Next, this 2-(4'-fluorophenyl)-5-formylpyrimidine (10 g, 0.05 mol) and 2-n-propyl-1,3-propanediol (5,8 g, 0.05 mol) were dissolved in dry toluene (200 ml), followed by adding p-toluenesulfonic acid (0.1 g) to the solution, fixing a water-draining cooler onto the vessel, reacting the solution on heating under reflux for 3 hours, cooling after completion of the reaction, washing with 5% sodium hyrogen carbonate aqueous solution and further with water, drying the toluene layer with anhydrous magnesium sulfate, distilling off toluene to obtain a residue (15.8 g), and recrystallizing it from toluene to obtain 2-{2'-(4"-fluorophenyl)pyrimidinyl-5'}-5-n-propyl-1,3-dioxane (7.0 g, 0.023 mol) having a CS point of 157° C., a SN point of 163° C. and a NI point of 173° C.

Further, the elemental analysis values of this compound accorded well with its theoretical values as follows:

| Element | Observed values | Theoretical values |
| --- | --- | --- |
| C | 67.5% | 67.53% |
| H | 6.3% | 6.33% |
| N | 9.2% | 9.26% |
| F | 6.2% | 6.28% | transition point expressed by a symbol ( ) refers to a monotropic one. "$\eta_{20}$" represents a viscosity at 20° C. Further, $\Delta n$, $\eta_{20}$ and $\Delta\epsilon$ in Table 1 refer to values sought from values of physical properties of the respective mixture systems of these compounds with a phenylcyclohexane liquid crystal composition according to extrapolation method.

TABLE 1

| Example | In formula (I) Y₁ | In formula (I) Y₂ | Phase transition point (°C.) C | S | N | I | Δn | $\eta_{20}$ (cP) | Δε |
| --- | --- | --- | --- | --- | --- | --- | --- | --- | --- |
| 1 | F–⌬– | C₃H₇ | • 157 | • 163 | • 173 | • | 0.12 | 20 | 23 |
| 2 | F,F–⌬– | C₃H₇ | • 103 | • 129 | • 152 | • | 0.23 | 38 | 28 |
| 3 | F,F–⌬– | C₅H₁₁ | • 99 | • — | — | 146 • | 0.22 | 40 | 26 |
| 4 | C₅H₁₁ | C₃H₇ | • (65 | •) — | — | 76 • | 0.03 | 13 | 13 |
| 5 | C₅H₁₁ | C₅H₁₁ | • 58 | • — | — | 87 • | 0.03 | 13 | 8 |
| 6 | C₅H₁₁ | C₅H₁₁–⬡(H)– | • — | — | — | 113 • | 0.08 | 28 | 18 |
| 7 | C₅H₁₁ | C₈H₁₇–⌬– | • 62 | • — | — | 156 • | 0.10 | 43 | 16 |
| 8 | C₂H₅–⌬– | C₃H₇ | • 149 | • 150 | • 185 | • | 0.20 | 30 | 15 |
| 9 | C₅H₁₁–⬡(H)– | C₃H₇ | • 111 | • 134 | • 165 | • | 0.12 | 27 | 21 |
| 10 | C₄H₉O–⌬– | C₃H₇ | • 125 | — | — | • 218 • | 0.19 | 34 | 21 |
| 11 | C₄H₉O–⌬– | C₆H₁₃ | • 129 | • 183 | • 203 | • | 0.16 | 33 | 17 |

EXAMPLES 2-11

Compounds prepared in the same manner as in Example 1 and their values of physical properties are shown in Table 1 together with the results of Example 1.

In the column of the phase transition point in Table 1, C represents crystalline phase; S, smectic phase, N, nematic phase; and I, isotropic liquid phase. The phase

EXAMPLE 12 (USE EXAMPLE 1)

A liquid crystal composition (A) consisting of

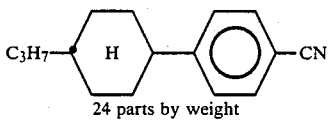

24 parts by weight

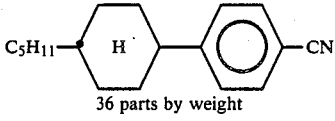

36 parts by weight

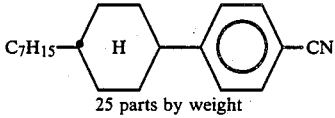

25 parts by weight

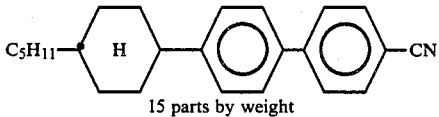

15 parts by weight had a N-I point (nematic-clearing point) of 72.0° C., a viscosity at 20° C., $\eta_{20}$ of 27.8 cp, a $\Delta\epsilon$ of 11.6 ($\epsilon_{\parallel}$ = 16.1, $\epsilon_{\perp}$ = 4.5) and a $\Delta n$ of 0.140 ($n_e$ = 1.632, $n_0$ = 1.492). When this composition was sealed in a TN cell of 10 μm thick, the resulting threshold voltage and saturation voltage were 1.75 V and 2.40 V, respectively.

When 2-(2'-n-pentylpyrimidinyl-5')-5-n-pentyl-1,3-dioxane (15 parts by weight) as a compound of the present invention, prepared in Example 5, was added to the liquid crystal composition A (85 parts by weight), the resulting liquid crystal composition had a N-I point of 60.7° C., a $\Delta n$ of 0.123 ($n_e$ = 1.614, $n_0$ = 1.491), a $\eta_{20}$ notably lowered down to 25.6, a $\Delta\epsilon$ of 11.1 ($\epsilon_{\parallel}$ = 15.9, $\epsilon_{\perp}$ = 4.8) and a threshold voltage and saturation voltage far reduced down to 1.55 V and 2.08 V, respectively.

EXAMPLE 13 (USE EXAMPLE 2)

A liquid crystal composition (B) consisting of

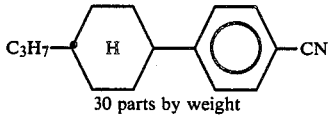

30 parts by weight

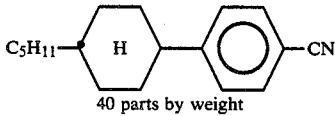

40 parts by weight

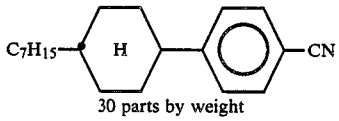

30 parts by weight had a N-I point of 52.1° C., a viscosity at 20° C., $\eta_{20}$ of 23.4 cp and a dielectric anisotropy value $\Delta\epsilon$ of 11.2 ($\epsilon_{\parallel}$ = 15.9, $\epsilon_{\perp}$ = 4.7). When this composition was sealed in a TN cell of 10 μm thick, the resulting threshold voltage and saturation voltage were 1.54 V and 2.13 V, respectively and its $\Delta n$ was 0.119 ($n_e$ = 1.609, $n_0$ = 1.490).

When 2-{2'-(3",4"-difluorophenyl)pyrimidinyl-5'}-5-n-propyl-1,3-dioxane (15 parts by weight) as a compound of the present invention, prepared in Example 2, was added to the liquid crystal composition (B) (85 parts by weight), the resulting liquid crystal composition had a N-I point raised up to 59.6° C., a $\eta_{20}$ and $\Delta\epsilon$ both greatly increased up to 25.6 cp and 13.8 ($\epsilon_{\parallel}$ = 19.2, $\epsilon_{\perp}$ = 5.4), a threshold voltage and saturation voltage both reduced down to 1.46 V and 2.05 V, respectively and a $\Delta n$ greatly increased up to 0.135 ($n_e$ = 1.632, $n_0$ = 1.497).

What we claim is:

1. A 2-pyrimidinyl-1,3-dioxane compound expressed by the formula

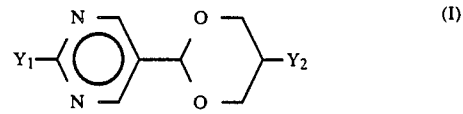

wherein $Y_1$ represents —CN, $R^2$,

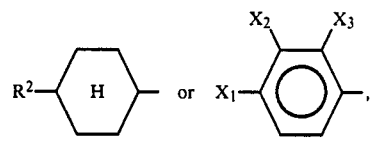

when $Y_2$ represents $R^1$, and when $Y_2$ represents

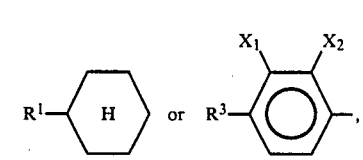

$Y_1$ represents $R^2$, wherein $R^1$ and $R^2$ each represent an alkyl group of 1 to 12 carbon atoms and $R^3$ represents an alkyl group or alkoxy group each of 1 to 12 carbon atoms, and $X_1$ represents $R^3$, CN or F and $X_2$ and $X_3$ each represent hydrogen atom or F atom.

2. A 2-pyrimidinyl-1,3-dioxane-compound according to claim 1 wherein when $Y_2$ represents $R^1$, $Y_1$ represents $R^2$, and when $Y_2$ represents $Y_1$ represents $R^2$, and wherein $R^1$, $R^2$ and $R^3$ are defined in claim 3.

3. A liquid crystal composition having at least two components at least one of which is a 2-pyrimidinyl-1,3-dioxane compound as set forth in claim 1.

4. A liquid crystal composition having at least two components at least one of which is a 2-pyrimidinyl-1,3-dioxane compound as set forth in claim 2.

* * * * *